(12) United States Patent
Siemens

(10) Patent No.: US 8,458,358 B2
(45) Date of Patent: Jun. 4, 2013

(54) METHOD FOR MANAGING A DATA CONNECTION AND NETWORK COMPONENT

(75) Inventor: Eduard Siemens, Sehnde (DE)

(73) Assignee: Tixel GmbH, Hannover (DE)

( * ) Notice: Subject to any disclaimer, the term of this patent is extended or adjusted under 35 U.S.C. 154(b) by 339 days.

(21) Appl. No.: 12/735,311

(22) PCT Filed: Dec. 17, 2008

(86) PCT No.: PCT/EP2008/067745
§ 371 (c)(1),
(2), (4) Date: Jul. 1, 2010

(87) PCT Pub. No.: WO2009/087030
PCT Pub. Date: Jul. 16, 2009

(65) Prior Publication Data
US 2010/0287302 A1 Nov. 11, 2010

(30) Foreign Application Priority Data

Jan. 4, 2008 (EP) ..................................... 08100104
Feb. 22, 2008 (EP) ..................................... 08101897

(51) Int. Cl.
*G06F 15/16* (2006.01)

(52) U.S. Cl.
USPC ........................................................ 709/233

(58) Field of Classification Search
USPC .......................................... 709/227–235, 236
See application file for complete search history.

(56) References Cited

U.S. PATENT DOCUMENTS

| 6,205,498 B1 * | 3/2001 | Habusha et al. ................ 710/29 |
| 6,850,491 B1 | 2/2005 | Firoiu et al. |
| 2002/0150048 A1 | 10/2002 | Ha et al. |
| 2003/0103243 A1 * | 6/2003 | Watanabe et al. ............. 358/405 |
| 2011/0085466 A1 * | 4/2011 | Shim ............................. 370/253 |

FOREIGN PATENT DOCUMENTS

EP 1429490 6/2004

OTHER PUBLICATIONS

Search Rept:Apr. 29, 2009.

* cited by examiner

*Primary Examiner* — Chirag R Patel
(74) *Attorney, Agent, or Firm* — Howard IP Law Group, P.C.

(57) ABSTRACT

The invention relates to a method for managing a data connection between a sending network component and a receiving network component via a network, and a network component, the method comprising the following steps: sending an initiating message to the receiving network component by the sending network component, to initiate a data connection between the sending network component and the receiving network component; receiving the initiating message by the receiving network component; sending further messages to the receiving network component by the sending network component; receiving the further messages by the receiving network component; calculating a transmission delay for at least one of the further messages received by the receiving network component; estimating optimal transmission parameters for transmitting messages between the sending network component and the receiving network component based on the calculated transmission delay, wherein estimating of the optimal transmission parameters substantially excludes the initiating message; and sending subsequent messages to the receiving network component by the sending network component at the estimated optimal transmission parameters.

13 Claims, 2 Drawing Sheets

METHOD FOR MANAGING A DATA CONNECTION AND NETWORK COMPONENT

Figure 1:
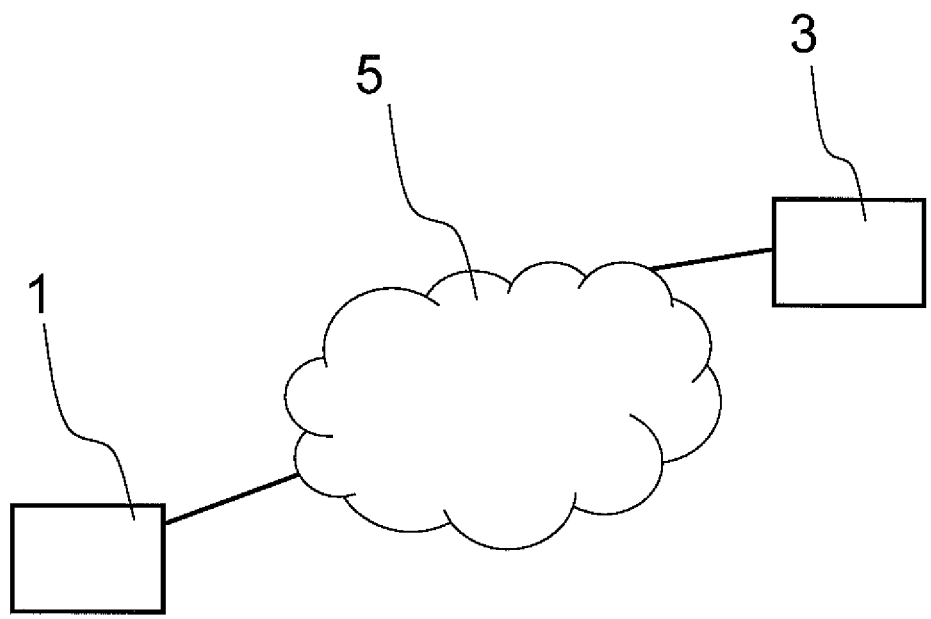

This application claims the benefit, under 35 U.S.C. §365 of International Application PCT/EP2008/067745, filed Dec. 17, 2008, which was published in accordance with PCT Article 21(2) on Jul. 16, 2009 in English and which claims the benefit of European patent application No. 08100104.2, filed Jan. 4, 2008 and European patent application No. 08101897.0, filed Feb. 22, 2008.

The present invention relates to a method for managing a data connection between a sending network and a receiving network via a network and a network component.

BACKGROUND OF THE INVENTION

An important issue in networks connecting network components through data connections or data links relates to the optimized use of the data connections. Ideally, the utilized network protocol will provide for adjustment of transmission parameters for transmitting messages via the data connections in such a way, that the available bandwidth of the data connections are used fully, while avoiding a loss of data. This aim may be achieved by appropriate congestion control in order to estimate or calculate an optimal transmission parameter such as an optimal transmission rate with which data of a message are transmitted. If the transmission rate is too low, the bandwidth of the physical connection is not utilized fully. On the other hand, a transmission rate adjusted too high might lead to overflow of transmission buffers and eventually to data loss.

The Internet Protocol (IP) is a widely utilized network protocol for data transport. IP delivers an unreliable connection service to upper layer protocols and to applications. However, many applications, such as file transfer based applications and many peer-to-peer applications, require reliable and lossless connection oriented network services. The adoption of unreliable IP services to stream-oriented lossless reliable services is a major task of the transport layer (layer four) of the Open Systems Interconnection Basic Reference Model or OSI Model. A well known transport protocol that delivers reliable connections over IP is the Transport Control Protocol (TCP), described in the publication ISI USC, *Transport Control Protocol*, Request for Comments. IETF, September 1981.

However, due to limitations of TCP on high throughput long distance connections (so called Long Fat Pipes), many new approaches of alternative transport protocols have been revealed in the recent past, as described by C. Anglano and M. Canonico in their publication *Performance analysis of high-performance file-transfer systems for Grid applications*, Concurrency and Computation: Practice & Experience, volume 18, pages 807-816 (2006). Most of those approaches and transport protocols derive their transmission data rate from the round-trip time (RTT) or from the one-way delay (OWD). Herein the OWD denotes the time it takes for a message, for example in form of a data packet, to travel from an origin or sending network component to a destination or receiving network component, while the RTT is the time period starting when the sending network component sends out a message and ending when a reply to the sent message, transmitted by the receiving network component is received by the sending network component.

To set an initial transmission rate at which messages are transmitted, the RTT or the OWD along the message path must be estimated at the beginning of the message transmission. Thus, in the case of packet based networks, wherein data is split into a set of data packets and transmitted between a sending and a receiving network component, the measurement of the OWD of the first data packet of a data transmission is commonly used for the estimation of the initial transmission rate. Once the data transmission commences with the estimated initial transmission rate, the transmission rate will be increased or decreased dependent on the used flow control algorithm, as well as on the network conditions such as loss frequency and delays of subsequent data packets.

One category of known algorithms for controlling the increase and decrease of the transmission rate during transmission of a set of packets utilizes a principle of additive increase and multiple decrease of the data rate (AIMD), which in a TCP environment is implemented as a so called Slow Start algorithm, both being described by T. Dunigan on a web article called *Floyd's TCP slow-start and AIMD mods* to be found on the internet site http://www.csm.ornl.gov/~dunigan/net100/floyd.html (June 2003).

Due to sophisticated caching mechanisms within hosts, but also within network nodes such as switches and routers of the network, the initial data packets of a data transmission or data connection experience different transmission delays than subsequent data packets. This leads to the transmission rate or other transmission parameters being adjusted by the sending network component to a value which does not properly reflect the actual conditions.

THE INVENTION

The object of the invention is to provide a method and a network component in order to improve the transmission properties of a data transmission via a network.

This object is achieved by a method for managing a data connection according to claim 1 and a network component according to claim 12.

According to one aspect of the invention, a method for managing a data connection between a sending network component and a receiving network component via a network is provided, the method comprising the following steps: sending an initiating message to the receiving network component by the sending network component, to initiate a data connection between the sending network component and the receiving network component; receiving the initiating message by the receiving network component; sending further messages to the receiving network component by the sending network component; receiving the further messages by the receiving network component; calculating a transmission delay for at least one of the further messages received by the receiving network component; estimating optimal transmission parameters for transmitting messages between the sending network component and the receiving network component based on the calculated transmission delay, wherein estimating of the optimal transmission parameters substantially excludes the initiating message; and sending subsequent messages to the receiving network component by the sending network component at the estimated optimal transmission parameters.

In a further aspect of the invention, a network component is provided, comprising: message preparation means configured to prepare an initiating message for initialing a data connection to a further network component; sending means configured to send the initiating message and further messages to the further network component; receiving means configured to receive a message acknowledgement and further message acknowledgements in response to the initiating message and the further messages; calculating means configured to calculate a transmission delay for at least one of the further messages; estimating means configured to estimate the optimal transmission parameters for transmitting messages to the further network component based on the calculated transmission delay, wherein estimating of the optimal transmission parameters substantially excludes the initiating message; and transmission parameter adjustment means configured to adjust parameters of transmission of messages to the estimated optimal transmission parameters.

The invention is based on the discovery of the phenomenon that the first or initiating message, which is transmitted by the sending network component to the receiving network component at the initiation of the data connection or in order to initiate the data connection, observes a much higher transmission delay than the subsequent messages. This higher transmission delay is in large part not due to congestion in the network. By substantially or fully excluding the initiating message from the estimation, a value of the optimal transmission delay may be obtained, which is not affected by said phenomenon and which more closely reflects the physical properties of the network.

In an advantageous embodiment of the invention, estimating optimal transmission parameters comprises estimating an optimal transmission rate for transmitting messages. Herein, a transmission rate is the rate, at which data transmission takes place, and may depend on the bandwidth of the established data connection. The transmission rate value may be a transmission rate average over multiple messages, thus taking into account the time periods between messages. Alternatively, the transmission rate value may be the data rate for transmission of the data within a single message. In addition or alternatively, the estimation of the optimal transmission parameters may include estimating an optimal time to wait between sending two messages by the sending network component.

According to a further embodiment of the invention, estimating the optimal transmission parameters for transmitting messages between the sending network component and the receiving network component comprises continuously comparing calculated transmission delays for subsequent messages until a minimum transmission delay is calculated, which is lower than a calculated transmission delay of a subsequent message, whereby estimating the optimal transmission parameters is based on the minimum transmission delay. This way, transitional effects that may affect more than just the initiating message may be reduced or eliminated.

Another preferred embodiment of the invention comprises the following steps: sending a message acknowledgement by the receiving network component to the sending network component as a response to the initiating message; and receiving the message acknowledgement by the sending network component, wherein the further messages are sent to the receiving network component after receiving the message acknowledgement. This embodiment has the advantage that the further messages do not become lost, because when receiving the message acknowledgement, the sending network component can be assured that the data connection has been successfully established, before sending the further messages.

A further embodiment of the invention comprises the step of re-sending the initiating message to the receiving network component by the sending network component, if the message acknowledgement is not received by the sending network component within a predetermined acknowledgement time delay after sending the initiating message to the receiving network component. In this case, the sending network component assumes that either the initiating message or the acknowledgment message have been lost. Such a predetermined acknowledgement time delay should be selected to be short enough in order to avoid wasting valuable time while waiting for the acknowledgement message to arrive.

An advantageous embodiment of the invention comprises the step of sending a further message acknowledgement by the receiving network component to the sending network component as a response to each of the further messages received. One advantage of this embodiment is that loss of data may be minimized, for example by re-transmitting each of the further messages for which the sending network component does not receive the corresponding message acknowledgement.

In a further embodiment of the invention, calculating the transmission delay comprises calculating a round trip time for the message pair consisting of the at least one of the further messages received and the corresponding further message acknowledgement. This has the advantage of taking into account delays in both directions between the sending and the receiving network components. The delay for the two transmission directions may differ, for example due to differing transmission paths.

In a preferred embodiment of the invention, calculating the transmission delay comprises calculating the one-way delay for the at least one of the further messages received by the receiving network component. In this case, estimating optimal transmission parameters may be performed in the receiving network component. Alternatively, the transmission delay may be calculated by the receiving network component and sent to the sending network component to serve as a basis for estimating optimal transmission parameters by the sending network component.

Advantageously, one embodiment of the invention comprises the step of waiting for a predetermined time period between sending of subsequent messages from the sending network component to the receiving network component. The predetermined time period may be an experience value depending on the structure of the network and may be adjusted in the course of the data transmission. Furthermore, this time period may be adjusted in the course of the data transmission, for example as a transmission parameter whose optimal value is estimated.

In a further preferred embodiment of the invention, the initiating message, the at least one further message, the message acknowledgement and the further message acknowledgements comprise data packets. More preferred, the data packets conform to the transmission control protocol (TCP) or the transmission control protocol in connection with the internet protocol (TCP/IP).

DRAWINGS

Figure 2:
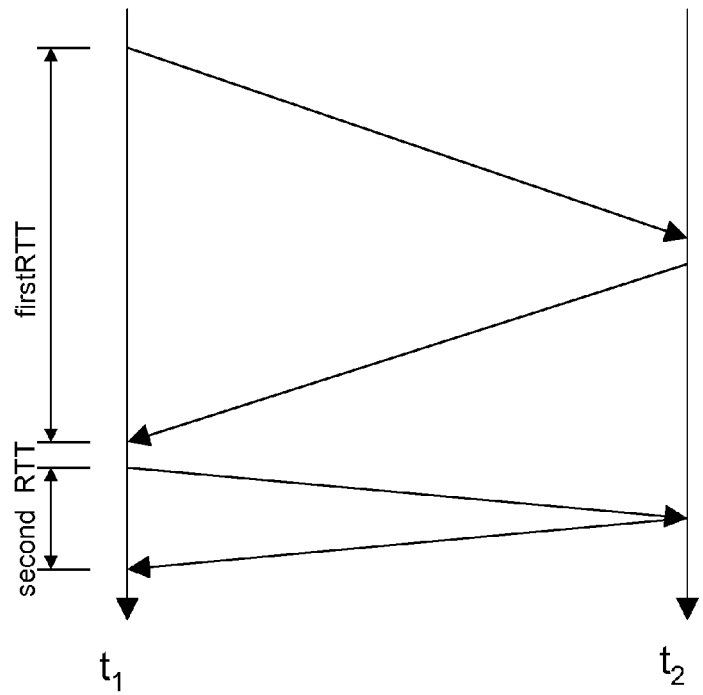
Figure 3:
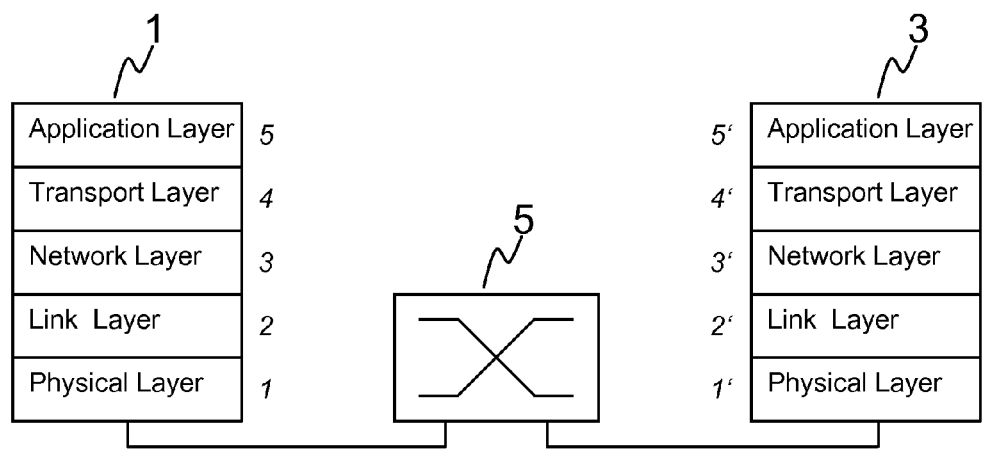

Embodiments of the invention are depicted in the drawings and will be explained hereinafter. The drawings show in:

FIG. 1 an arrangement of a sending component and a receiving component connected via a network;

FIG. 2 an illustration of the so-called connection opener effect when setting up a data connection; and FIG. 3 an illustration of the involvement of the different network protocol layers for the transfer of data packets.

EMBODIMENTS

Shown in the FIG. 1 are a sending component 1 and a further network component 3, which are each connected to a network 5 with wire or wireless connections. Via the network 5, the two network components 1 and 3 may communicate by first establishing a data connection. Depending on the complexity of the network 5, such a data connection may lead over one or several other components (not shown in FIG. 1) inside the network 5, including switches and routers, which direct messages from the sending network component 1 to the receiving network component 3 and vice versa.

When establishing a data connection between the two network components 1 and 3, the first message transmitted by the sending network component 1 and received by the receiving network component 3 is defined herein as the initiating message, because it initiates the data connection. The initiating message may also be called a "connection opener message", or a "connection opener packet" in a packet based network, because after transmission of this packet, the connection is "opened", for example forwarding tables within the network components 1, 3, and the other components such as switches and routers are cached properly when the first packet passes through, so that subsequent data packets can be switched much faster than the initiating packet.

Congestion control includes a number of different implementations that may differ in which transmission parameters are adjusted and/or in how these parameters are estimated. For message transmission protocols such as the transmission control protocol (TCP) and variations thereof, an algorithm called "slow start" is widely used.

According to the slow start algorithm, a congestion window, corresponding to a buffer size at the sending network component 1 for the message to be transmitted, is set to an initial value depending on the TCP variation employed, such as TCP Reno, TCP Newreno, TCP Tahoe etc. After sending the initiating message to the receiving network component 3, the sending network component 1 will wait for an acknowledgement by the receiving network component 3. After receiving the initiating message acknowledgement, the sending network component 1 will transmit further messages and receive their respective message acknowledgements. Depending on the round trip time (RTT) calculated for the message/message acknowledgement pairs, new values for the congestion window and a further slow start parameter, the slow start threshold, are estimated. Within the congestion window, the messages are sent using the highest available transmission rate, although preferably the transmission rate is a transmission parameter to be adjusted during the course of the transmission.

In other, more "intelligent" TCP variations, such as TCP Westwood and TCP BIC (Binary Increase Congestion control), the bandwidth and therefore the optimal transmission rate available for data transmission through the network 5 is estimated based on the calculation of the round trip time (RTT) of the initiating message and subsequent messages. The RTT values may be averaged for this purpose, for example by taking a weighted average or by using a low pass filter.

Another important value besides the congestion window size and the slow start threshold is the timeout, which is the time period the sending network component 1 will wait for an acknowledgement before re-transmitting a message. The time-out may be calculated through an estimated RTT value RTTest and a deviation of RTT values RTTdev for a number of message/message acknowledgement pairs, as timeout=RTTest+4*RTTdev.

Due to sophisticated caching mechanisms within hosts such as the two network components 1 and 3, but also within network nodes such as switches and routers of the network, the initiating message experiences an exceptionally high transmission delay. This phenomenon can be observed on connections within local area networks (LAN) as well as within wide area networks (WAN), is essentially independent of the link data rate, and is generally known as the so called connection opener effect. That is because the initiating message experiencing the exceeding transmission delay acts as the connection opener for the connection between the sending network component 1 and the receiving network component 3.

This effect is illustrated in FIG. 2. There are two time lines shown. Time line $t_1$ is for the transmitting station, and time line $t_2$ for the receiving station. The first packet transmission starts at the origin of the upper arrow. When the packet is received, the receiver returns an acknowledge message back to the transmitting station. This is depicted by the second arrow. Both transmissions need not necessarily take the same amount of time. Returning back a packet to the sender usually takes less time because the connection has already been opened before. A second data packet transfer is shown in the lower part of FIG. 2. Obviously, the transfer time for the second data packet is subjectively lower than for the first packet. This is valid for both directions, forth and back. In the illustrated example, the second round trip time second RTT is only a quarter of the first round trip time first RTT. An explanation for the effect was already presented above. The setting-up of a connection takes more time. Memory needs to be allocated in each layer for the data transport, addresses need to managed, routing tables or switching tables need to be set up in routers and switches along the transfer path, caching rules need to be set, and so on.

The following listings are exemplary outputs to a number of ping inquiries for Fast Ethernet links. The output to each ping inquiry includes a set comprising parameters for transmitted messages. The initiating messages have the sequence number "1" (icmp_seq=1). The expression "time" denotes the RTT for each message in milliseconds (ms). As can be seen here, the initiating message has a significantly higher RTT than the further messages following the initiating message. In the examples shown here, the RTTs differ by more than an order of magnitude.

```
~# ping hanvd601linux
PING hanvd601linux (141.11.97.29) 56(84) bytes of data.
64 bytes from hanvd601linux. (141.11.97.29):
icmp_seq=1 ttl=64 time=3.18 ms
64 bytes from hanvd601linux. (141.11.97.29):
icmp_seq=2 ttl=64 time=0.101 ms
64 bytes from hanvd601linux. (141.11.97.29):
icmp_seq=3 ttl=64 time=0.100 ms
64 bytes from hanvd601linux. (141.11.97.29):
icmp_seq=4 ttl=64 time=0.101 ms
64 bytes from hanvd601linux. (141.11.97.29):
icmp_seq=5 ttl=64 time=0.100 ms
64 bytes from hanvd601linux. (141.11.97.29):
icmp_seq=6 ttl=64 time=0.099 ms
64 bytes from hanvd601linux. (141.11.97.29):
icmp_seq=7 ttl=64 time=0.100 ms
64 bytes from hanvd601linux. (141.11.97.29):
icmp_seq=8 ttl=64 time=0.100 ms
64 bytes from hanvd601linux. (141.11.97.29):
icmp_seq=9 ttl=64 time=0.100 ms
ping statistics
9 packets transmitted, 9 received, 0% packet loss, time 8003ms
rtt min/avg/max/mdev = 0.099/0.442/3.180/0.968 ms
~# > ping hanvd602linux
PING hanvd602linux. (141.11.97.30) 56(84) bytes of data.
64 bytes from hanvd602linux. (141.11.97.30):
icmp_seq=1 ttl=64 time=3.85 ms
64 bytes from hanvd602linux. (141.11.97.30):
icmp_seq=2 ttl=64 time=0.131 ms
64 bytes from hanvd602linux. (141.11.97.30):
icmp_seq=3 ttl=64 time=0.134 ms
64 bytes from hanvd602linux. (141.11.97.30):
icmp_seq=4 ttl=64 time=0.135 ms
64 bytes from hanvd602linux. (141.11.97.30):
```

-continued

```
icmp_seq=5 ttl=64 time=0.132 ms
64 bytes from hanvd602linux. (141.11.97.30):
icmp_seq=6 ttl=64 time=0.216 ms
64 bytes from hanvd602linux. (141.11.97.30):
icmp_seq=7 ttl=64 time=0.134 ms
64 bytes from hanvd602linux. (141.11.97.30):
icmp_seq=8 ttl=64 time=0.133 ms
64 bytes from hanvd602linux. (141.11.97.30):
icmp_seq=9 ttl=64 time=0.137 ms
--- hanvd602linux ping statistics ---
9 packets transmitted, 9 received, 0% packet loss, time 7999ms
rtt min/avg/max/mdev = 0.131/0.556/3.857/1.167 ms
~# ping hanvd0659linux
PING hanvd0659linux. (141.11.97.41) 56(84) bytes of data.
64 bytes from hanvd0659linux. (141.11.97.41):
icmp_seq=1 ttl=64 time=5.68 ms
64 bytes from hanvd0659linux. (141.11.97.41):
icmp_seq=2 ttl=64 time=0.141 ms
64 bytes from hanvd0659linux. (141.11.97.41):
icmp_seq=3 ttl=64 time=0.142 ms
64 bytes from hanvd0659linux. (141.11.97.41):
icmp_seq=4 ttl=64 time=0.140 ms
64 bytes from hanvd0659linux. (141.11.97.41):
icmp_seq=5 ttl=64 time=0.141 ms
64 bytes from hanvd0659linux. (141.11.97.41):
icmp_seq=6 ttl=64 time=0.142 ms
64 bytes from hanvd0659linux. (141.11.97.41):
icmp_seq=7 ttl=64 time=0.142 ms
64 bytes from hanvd0659linux. (141.11.97.41):
icmp_seq=8 ttl=64 time=0.141 ms
```

The following listing is an exemplary output to a ping inquiry for a 10 Gigabit Ethernet link. The connection opener effect can also be observed here.

```
~#ping 10.24.69.1
PING 10.24.69.1 (10.24.69.1) 56(84) bytes of data.
64 bytes from 10.24.69.1: icmp_seq=1 ttl=64 time=3.92 ms
64 bytes from 10.24.69.1: icmp_seq=2 ttl=64 time=0.063 ms
64 bytes from 10.24.69.1: icmp_seq=3 ttl=64 time=0.062 ms
64 bytes from 10.24.69.1: icmp_seq=4 ttl=64 time=0.062 ms
64 bytes from 10.24.69.1: icmp_seq=5 ttl=64 time=0.062 ms
64 bytes from 10.24.69.1: icmp_seq=6 ttl=64 time=0.062 ms
64 bytes from 10.24.69.1: icmp_seq=7 ttl=64 time=0.069 ms
64 bytes from 10.24.69.1: icmp_seq=8 ttl=64 time=0.062 ms
64 bytes from 10.24.69.1: icmp_seq=9 ttl=64 time=0.062 ms
--- 10.24.69.1 ping statistics ---
9 packets transmitted, 9 received, 0% packet loss, time 7999ms
rtt min/avg/max/mdev = 0.062/0.491/3.922/1.213 ms
```

The following listing shows an exemplary output to a ping inquiry for a WAN connection. Here also, the connection opener effect described above is affecting the RTT of the initiating message, albeit not as distinctive.

```
ping 130.75.1.32
PING 130.75.1.32 (130.75.1.32) 56(84) bytes of data.
64 bytes from 130.75.1.32: icmp_seq=1 ttl=53 time=69.8 ms
64 bytes from 130.75.1.32: icmp_seq=2 ttl=53 time=49.9 ms
64 bytes from 130.75.1.32: icmp_seq=3 ttl=53 time=49.8 ms
64 bytes from 130.75.1.32: icmp_seq=4 ttl=53 time=53.2 ms
```

Since applications and transport protocols perform their initial transmission rate estimation based (among other parameters) on the delays of the initiating message, the estimated transmission parameters will differ significantly from their optimal value. In other words, the communication opener effect distorts the estimation for the optimal transmission parameters. Herein, optimal value denotes the transmission parameter value at which the highest throughput of data through the network is achieved while avoiding loss of data. For instance, due to the initiating message experiencing an exceptionally high transmission delay, the initial estimation of the transmission rate will be too low, for example it may be one order of magnitude lower than it could be without the effect of the connection opener packet.

FIG. 3 shows the involvement of the different network layers in the data transport between transmitter 1 and receiver 3. The depicted layers correspond to the layers defined in the ISO/OSI reference model for data communication. Physical layer 10 and link layer 20 might be in an 10 GBit Ethernet or Infiniband interface, implemented in hardware. The other layers, network layer 30, transport layer 40 and application layer 50 are preferably implemented with software means. Reference number 5 denotes the network components with e.g. switchers and routers. Depending on which network layer is estimating the RTT values, different results may be achieved. However, the connection opener effect stays in principle the same. In each layer a number of steps like memory allocation need to be performed for opening a connection which later on will be left out when further packets are processed for the transfer over the same connection. The implementation of transmission delay estimation according to the invention can be located at any one of the different network layers in the transmitter 1 and/or receiver 3. E.g. an implementation in network layer 30 of the transmitting station 1 would be feasible. The estimated RTT would include the time from giving the order of transmitting the packet in network layer 30 until the packet is received in the receiving station 3 in network layer 30' and the time period until the ACK packet is received back in network layer 30 in the transmitting station 1. Different scopes of connection opener messages are from Tx physical layer 10 to Rx physical layer 10', Tx link layer 20 to Rx link layer 20', Tx network layer 30 to Rx network layer 30', Tx transport layer 40 to Rx transport layer 40' and application layer 50 to application layer 50'. The more layers are involved in the transmission, the higher RTT or OWD values will be observed. The total RTT value is an integration of different delay components like processing steps in the different involved network layers in the transmitting station, processing steps in network components like switchers and routers, processing steps in the different involved network layers in the receiving station and transfer times over the network cable, and so on.

The congestion control algorithms described so far and other congestion control algorithms, which take into account the transmission delay such as RTT and/or OWD of the initiating message, may be improved according to the invention such that the initiating message is substantially excluded. By substantially excluded, it is meant that it does not or at least not significantly affect the estimate for the optimal transmission parameter. There are a number of different ways to implement an algorithm for estimating an optimal transmission parameter such as a transmission rate. Once an optimal transmission parameter has been obtained, it may be used as an initial transmission parameter for the communication between the sending network component 1 and the receiving network component 3 via the network 5. Then, the same algorithm or other congestion control algorithms may be employed to adjust the transmission parameter, starting from this initial transmission parameter. Some algorithms for estimating an optimal transmission parameter while excluding the initiating message will be described in the following.

In one embodiment, the sending network component 1 transmits the initiating message, such as the synchronize (SYN) packet of TCP, to the receiving network component 3 and waits for a message acknowledgement (ACK) indicating that the initiating message has been received. At that point, the sending network component 1 will not calculate any transmission delays, such as RTT or OWD, for the message/message acknowledgement pair, but rather exchange a further message/message acknowledgement pair or pairs with the receiving network component 3 and use their transmission delay to estimate optimal transmission parameters. One may also define a maximum waiting time. If the message acknowledgement is not received by the sending network component 1 within the maximum waiting time after transmitting the initiating message, it retransmits the initiating message.

In a further embodiment, instead of waiting for the acknowledgement message, after transmitting the initiating message, the sending network component 1 repeats transmitting further messages, such as SYN data packets, even before receiving any message acknowledgements. After each acknowledgement message received, a transmission delay such as RTT will be calculated by the sending network component 1 and compared to the transmission delay calculated for the previous message/message acknowledgement pair or pairs. Once the thus calculated transmission delay values stop decreasing, the lowest calculated transmission delay value will be used as basis for the estimation of the transmission parameters. In other words, not just the message/message acknowledgement pair for the initiating message will be excluded from the estimation of the transmission parameters as in the previously described embodiment, but all message/message acknowledgement pairs will be ignored until a minimum transmission delay value has been obtained.

In yet another embodiment, the estimation of the transmission delay may be based on OWD calculation for the messages sent between the network components 1 and 3. For this case, the receiving network component 3 calculates the OWD for the initiating message and the further messages received from the sending network component 1. The receiving network component 3 furthermore compares the OWD values calculated for the message received to each other until it detects that the OWD does not decrease anymore, that is, it reaches a minimum OWD value. This minimum OWD value may then be used to estimate the optimal transmission delay. The receiving network component 3 may transmit message acknowledgements as a response to each message back to the sending network component 1. In this case, the OWD values may alternatively be calculated by the sending network component 1 based on information contained in the message acknowledgements.

The previously described embodiments may be modified such that the sending network component 1 waits a predetermined time period or time gap between transmitting each message to the receiving network component 3 in order to avoid overloading the data connection or the network 5. This predetermined time period may be fixed. However, preferably it will be adjusted depending on the available connection parameters such as bandwidth. A suitable time gap between two messages may be 10 to 100 times the minimum time period between two messages as required by the utilized data link, leading to a 1% to 10% link usage.

The features of the invention as disclosed in the above description, in the claims and in the drawing may be of importance for the implementation of the various embodiments of the invention both individually and in any desired combination.

What is claimed is:

1. Method of managing a data connection between a sending network component and a receiving network component via a network, the method comprising the following steps:

sending an initiating message to the receiving network component by the sending network component, to initiate a data connection between the sending network component and the receiving network component;

receiving, at the sending network component, an acknowledgement message for the initiating message from the receiving network component;

sending further messages to the receiving network component by the sending network component;

receiving, at the sending network component, acknowledgement messages for the further messages from the receiving network component;

calculating, at the sending network component or the receiving network component, a transmission delay for at least one of the further messages received by the receiving network component;

estimating, at the sending network component or at the receiving network component, optimal transmission parameters for transmitting messages between the sending network component and the receiving network component based on the calculated transmission delay, wherein estimating of the optimal transmission parameters excludes the initiating message; and sending subsequent messages to the receiving network component by the sending network component at the estimated optimal transmission parameters.

2. Method according to claim 1, comprising estimating optimal transmission parameters comprises estimating an optimal transmission rate for transmitting messages.

3. Method according to claim 1, comprising estimating the optimal transmission parameters for transmitting messages between the sending network component and the receiving network component comprises continuously comparing calculated transmission delays for subsequent messages until a minimum transmission delay is calculated, which is lower than a calculated transmission delay of a subsequent message, whereby estimating the optimal transmission parameters is based on the minimum transmission delay.

4. Method according to claim 1, wherein the further messages are sent to the receiving network component after receiving the message acknowledgement for the initiating message.

5. Method according to claim 4, comprising the step of re-sending the initiating message to the receiving network component by the sending network component, if the message acknowledgement for the initiating message is not received by the sending network component within a predetermined acknowledgement time delay after sending the initiating message to the receiving network component.

6. Method according to claim 1, comprising that calculating the transmission delay comprises calculating a round trip time for the message pair comprising the at least one of the further messages received and the corresponding further message acknowledgement.

7. Method according to claim 1, comprising calculating the transmission delay comprises calculating a one-way delay for the at least one of the further messages received by the receiving network component.

8. Method according to claim 1, comprising the step of waiting for a predetermined time period between sending of subsequent messages from the sending network component to the receiving network component.

9. Method according to claim 1, comprising the initiating message, the at least one further message, the message acknowledgement and the further message acknowledgements comprise data packets.

10. Method according to claim 9, comprising the data packets conform to the transmission control protocol or the transmission control protocol in connection with the internet protocol.

11. Network component comprising:
- message preparation means configured to prepare an initiating message for initialing a data connection to a further receiving network component;
- sending means configured to send the initiating message and further messages to the further receiving network component;
- receiving means configured to receive a message acknowledgement and further message acknowledgements from the receiving network component in response to the initiating message and the further messages;
- calculating means configured to calculate a transmission delay for at least one of the further messages;
- estimating means configured to estimate a transmission parameter for transmitting messages to the receiving network component based on the calculated transmission delay, wherein estimating of the optimal transmission parameters substantially excludes transmission delays associated with the initiating message; and
- transmission parameter adjusting means configured to adjust a parameter for the transmission of messages to the estimated optimal transmission parameter.

12. A receiving network component comprising:
- a receiving means configured to receive an initiating message and one or more further messages from a sending network component;
- a sending means configured to send a message acknowledgement and further message acknowledgements from the receiving network component in response to the initiating message and the one or more further messages;
- a calculating means configured to calculate a transmission delay for the initiating message and at least one of the one or more further messages;
- an estimating means configured to estimate a transmission parameter for transmitting messages to the sending network component based on the calculated transmission delay, wherein estimating of the transmission parameter excludes the use of the transmission delay of the initiating message.

13. A method according to claim 1, wherein the step of estimating of the transmission parameters further excludes the use of the transmission delay of one or more of the successive calculated transmission delays of the further messages following the initiating message.

* * * * *